United States Patent
Shimizu et al.

(10) Patent No.: US 8,532,208 B2
(45) Date of Patent: Sep. 10, 2013

(54) TRANSMISSION METHOD AND TRANSMISSION APPARATUS

(75) Inventors: Masahiko Shimizu, Kawasaki (JP); Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 164 days.

(21) Appl. No.: 12/716,409

(22) Filed: Mar. 3, 2010

(65) Prior Publication Data

US 2010/0158153 A1    Jun. 24, 2010

Related U.S. Application Data

(63) Continuation of application No. PCT/JP2007/068438, filed on Sep. 21, 2007.

(51) Int. Cl.
*H04L 25/49* (2006.01)
*H04L 25/03* (2006.01)

(52) U.S. Cl.
USPC .......................................... 375/261; 714/748

(58) Field of Classification Search
USPC .......... 375/261, 286, 298, 308, 296; 714/748
See application file for complete search history.

(56) References Cited

U.S. PATENT DOCUMENTS

| | | | |
|---|---|---|---|
| 2003/0072292 A1* | 4/2003 | Yoon et al. ...................... | 370/342 |
| 2003/0081690 A1* | 5/2003 | Kim et al. ...................... | 375/264 |
| 2004/0125882 A1 | 7/2004 | Miyoshi | |
| 2004/0199846 A1 | 10/2004 | Matsumoto et al. | |
| 2004/0237016 A1 | 11/2004 | Sudo | |
| 2005/0180363 A1 | 8/2005 | Yano et al. | |
| 2005/0193307 A1* | 9/2005 | Wengerter et al. ............ | 714/749 |
| 2005/0213543 A1 | 9/2005 | Shimizu et al. | |
| 2007/0268814 A1* | 11/2007 | Li ................................. | 370/207 |
| 2008/0043776 A1 | 2/2008 | Yun et al. | |
| 2008/0233901 A1 | 9/2008 | Ebiko et al. | |
| 2008/0279305 A1* | 11/2008 | Matsumoto et al. .......... | 375/295 |
| 2009/0028259 A1* | 1/2009 | Yu et al. ........................ | 375/260 |
| 2009/0028263 A1 | 1/2009 | Yu et al. | |
| 2009/0042519 A1* | 2/2009 | Sudo ............................. | 455/101 |
| 2009/0327831 A1* | 12/2009 | Xue et al. ...................... | 714/751 |
| 2010/0158153 A1 | 6/2010 | Shimizu et al. | |

FOREIGN PATENT DOCUMENTS

| | | |
|---|---|---|
| JP | 2002359882 | 12/2002 |
| JP | 2003152691 | 5/2003 |
| JP | 2003258757 A | 9/2003 |
| JP | 2003309535 | 10/2003 |
| JP | 2004072427 | 3/2004 |
| JP | 2005101975 | 4/2005 |

(Continued)

OTHER PUBLICATIONS

3GPP TS 25.212 V7.4.0 (Mar. 2007) 3rd Generation Partnership Project; Technical Specification Group Radio Access Network; Multiplexing and channel coding (FDD) (Release 7).

K. Brueninghaus, et al., "Link Performance Models for System Level Simulations of Broadband Radio Access Systems" IEEE 16th International Symposium on PIMRC 2005.

International Search Report in corresponding International application No. PCT/JP2007/068438, dated Dec. 18, 2007.

Japanese Notification of Reason(s) for Refusal dated May 17, 2011 for application No. 2009-533018.

Japanese Notification of Reason(s) for Refusal dated Apr. 12, 2012 issued in application No. 2011-139452.

Extended European Search Report dated Feb. 25, 2013 issued in the corresponding European Patent Application No. 07807769.0-1851/2192713.

*Primary Examiner* — Aristocratis Fotakis
(74) *Attorney, Agent, or Firm* — Smith, Gambrell & Russell, LLP

(57) ABSTRACT

A transmission apparatus obtains, for each transmission to a reception apparatus, information on a per-bit transmission of a transmission bit string, and controls a per-bit transmission condition for a current transmission bit string such that a per-bit transmission quality of the transmission bit string approaches evenly based on cumulative information on the transmissions up to the last transmission.

5 Claims, 15 Drawing Sheets

(56) References Cited

FOREIGN PATENT DOCUMENTS

| | | |
|---|---|---|
| JP | 2005229319 | 8/2005 |
| JP | 2005269670 | 9/2005 |
| JP | 2005277570 | 10/2005 |
| JP | 2006245912 A | 9/2006 |
| JP | 2007180793 | 7/2007 |
| JP | 4792527 | 10/2011 |
| WO | 03043260 A1 | 5/2003 |
| WO | 03043261 | 5/2003 |
| WO | 2006082816 | 8/2006 |
| WO | 2006101213 A1 | 9/2006 |

* cited by examiner

TRANSMISSION METHOD AND TRANSMISSION APPARATUS

CROSS-REFERENCE TO RELATED APPLICATION

This application is a continuation Application of a PCT international application No. PCT/JP2007/068438 filed on Sep. 21, 2007 in Japan, the entire contents of which are incorporated by reference.

FIELD

The embodiments discussed herein are related to a transmission method and a transmission apparatus.

BACKGROUND

Multi-level modulation schemes, such as one in the QPSK or the 16-QAM, are known as one type of modulation schemes for the wireless communication technique. In multi-level modulation schemes, a transmission bit string that is encoded using an error correction code, such as a turbo code, is mapped to a multi-level modulation signal (symbol). In the case of the 16-QAM, since one symbol is made up of four bits, a transmission bit string is mapped to one of the four bits.

In addition, the HARQ is known as one of elemental techniques for wireless communication techniques, such as the High Speed Downlink Packet Access (HSDPA) (see Non-Patent Document 1 that is listed below, for example). The HARQ is the technique in which data, a reception of which failed, is retained, instead of discarding it at the receiving party, and the data is decoded (error correction decoded) together with other data sent from the transmitting party. In this manner, the gain in error correction code is increased and thus reducing the retransmission count even when an error occurs, by effectively utilizing data that has been received.

Furthermore, the MIMO is known as one technique for wireless communications. The MIMO is a technique to improve the transmission rate without requiring an increase in the frequency band, in which multiple antennas are used for both transmission and reception, dependent data streams are sent from multiple antennas of the transmitter, and multiple signals (data stream) that are mixed on the transmission path (channel) are separated from each other from signals received by each reception antenna of the receiver.

Note that Patent Document 1 that is listed below describes that the error resilience of code division blocks are deviated caused by the signal point arrangement of multi-level modulation signals and the uniformity in the quality among the blocks may be reduced. Thus, it is possible to make the error resilience among blocks to approach evenly by manipulating (controlling) a transmission bit string such that the occupying rate of organizational bit (or redundant bit) included in each block approaches evenly.

Patent Document 1: Japanese Laid-Open Patent Application No. 2005-229319

Non-Patent Document 1: 3GPP TS 25.212 V7.4.0 (2007-03)

SUMMARY (1) According to an aspect of the embodiments, a method includes a transmission method for transmitting, to a reception apparatus, a transmission bit string containing a bit that is sent from a transmission apparatus to the reception apparatus, the method including: by the transmission apparatus: obtaining, for each transmission to the reception apparatus, information on a per-bit transmission of a transmission bit string; and controlling a per-bit transmission condition for a current transmission bit string such that a per-bit transmission quality of the transmission bit string approaches evenly based on cumulative information on the transmissions up to the last transmission.

(2) According to an aspect of the embodiments, an apparatus includes a transmission apparatus that transmits, to a reception apparatus, a transmission bit string containing a bit that is sent, the apparatus including: an obtainment unit that obtains, for each transmission to the reception apparatus, information on a per-bit transmission of a transmission bit string; and a control unit that controls a per-bit transmission condition for a current transmission bit string such that a per-bit transmission quality of the transmission bit string approaches evenly based on cumulative information on the transmissions up to the last transmission obtained by the obtainment unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

[1] General Explanation

In this example, mapping of a transmission bit string to a symbol (signal point) of multi-level modulation, such as one in the QPSK or the 16-QAM, allocation of a transmission bit string to transmission antennas of the MIMO, and the signal quality (reception quality) of each bit that is dependent on mapping destinations (signal point locations, antennas to be allocated) are considered. Note that, hereinafter, allocating a transmission bit string to one of transmission antennas is also referred to as "mapping."

For example, when an error correction encoded transmission bit string is sent by carrying out rate matching (puncture processing or repetition processing) such that the string is accommodated within a predetermined transmission frame and thereafter mapping to a multi-level modulation signal (symbol), such as one in the 16-QAM, transmission counts of each bit within the transmission bit string may deviate if retransmission control (for example, retransmission control based on the HARQ) is carried out.

Figure 1:
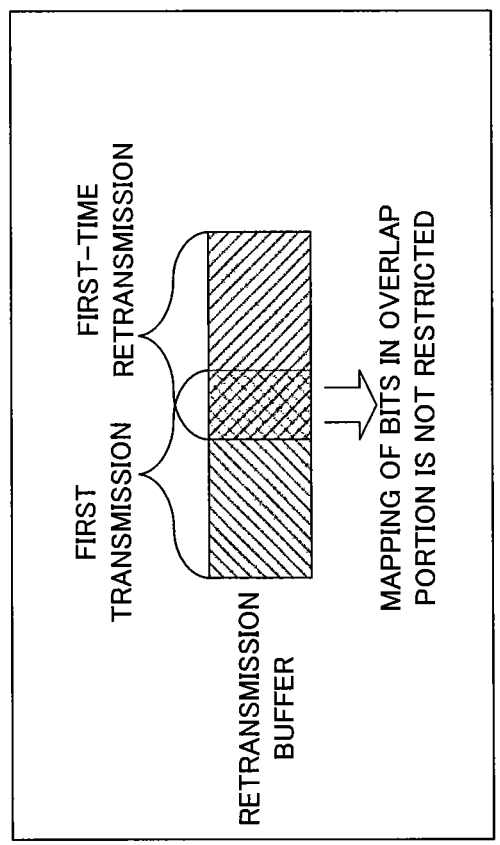
FIG. 1 is a schematic diagram illustrating there is no rule for mapping of bits with different transmission counts to multi-level modulation signals in a retransmission buffer.

That is, in systems, such as HSDPA systems employing the adaptive modulation and coding (AMC) scheme, since the number of bits included in a transmission bit string is not always constant. Thus, when focusing on the first transmission and the first-time retransmission, when the transmission bit string is mapped to a symbol of a multi-level modulation as schematically illustrated in FIG. 1, for example, some bits may be transmitted in both the first transmission and the first-time retransmission, but other bits may be processed differently (such bits are transmitted in the first transmission and/or the first-time retransmission).

There has been no way figured out how such a transmission bit string containing bits with different transmission counts is to be mapped to a symbol of a multi-level modulation, or how bits with different transmission counts to be allocated to which transmission antenna for the MIMO communication.

For this reason, there may be a deviation (variation) in the per-bit reception quality (likelihood) as a result of an HARQ synthesis at the receiving party, and thus the wireless communication characteristic (for example, communication capacity) may not be always optimized.

In such an example, the reception characteristic is improved by applying a rule of mapping by using the following characteristics.

Figure 2:
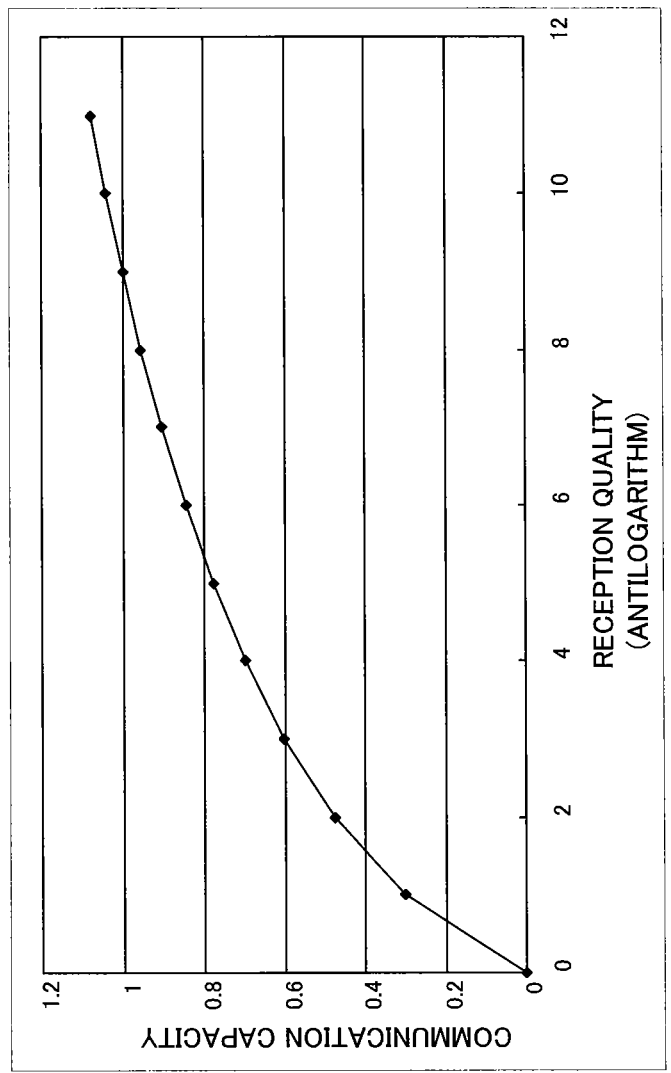
FIG. 2 is a graph illustrating one example of the relationship between the signal quality and the communication capacity.

The relationship between the communication capacity versus the signal quality (for example, the signal noise ratio (SNR), likelihood, or the like) is such that the slope (the magnitude of an improvement in the communication capacity) is increased when the signal quality (reception quality) is lower, meaning that the communication capacity can be more easily improved with a smaller change in the signal quality, as illustrated in FIG. 2. On the other hand, since the slope is decreased when the signal quality becomes somewhat high, the rate of an improvement in the communication capacity is reduced with respect to an improvement in the signal quality. Note that the characteristic depicted in FIG. 2 corresponds to the Shannon's communication capacity, and is used for approximation of error rates in the following reference.

Reference: K. Brueninghaus et al., "Link performance models for system level simulations of broadband radio access systems", in Proc. PIMRC 2005

Accordingly, it is possible to improve (increase) the communication capacity by sending a bit in a lower signal quality twice (in the first transmission and the first-time retransmission), for example.

Figure 3:
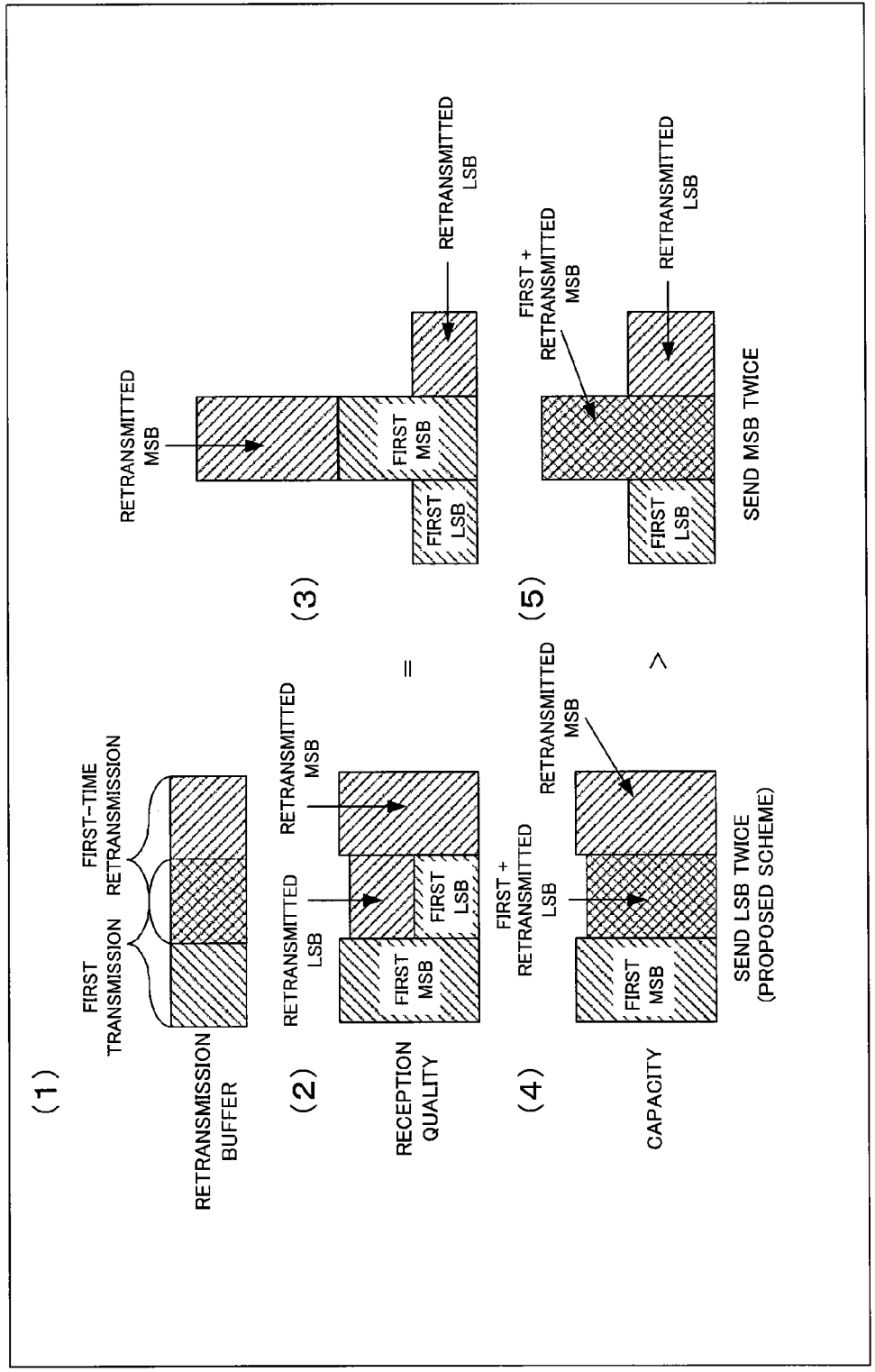
FIG. 3 is a schematic diagram illustrating how mapping of bits having greater transmission counts to lower quality bits (LSBs) can improve the communication capacity.

For example, as schematically illustrated in FIG. 3 (1), a case is assumed in which a transmission bit sequence of a predetermined bit length is stored in a transmission buffer and bits that are to be sent twice (in the first transmission and the first-time retransmission) (hereinafter, referred to as "overlapped bits") are present in the transmission bit sequence.

In addition, it is assumed that the transmission bit sequence is (mapped and) sent by relating the sequence to a transmission symbol (signal point) of a multi-level modulation (for example, the 16-QAM). The transmission symbol (signal point) can be represented by values of the I-axis (bits of the MSB and the LSB) and values of the Q-axis (bits of the MSB and the LSB) on the complex plane of the I channel and the Q channel (the I-Q plane).

Here, on this complex plane, focusing on bits that are mapped to the outer signals point (in the farther locations on the I-axis and the Q-axis), an MSB does not become an error (i.e., remains zero or one) even when such a signal point is erroneously mapped to the adjacent signal point. On the other hand, an LSB may become an error (i.e., zero is inverted to one, or one is inverted to zero) when the LSB becomes an error to the adjacent signal point when mapped to any of the signal points. That is, it can be said that MSBs are relatively more error resilient compared to LSBs in this case because of the characteristic of the mapping destination.

Accordingly, it can be said that bits mapped to MSBs are more error resilient, and thus have higher signal quality, compared to bits mapped to LSBs.

In this case, comparing between the case in which, as schematically illustrated in FIG. 3 (3), a transmission bit string is sent by mapping bits overlapping in the first transmission and the first-time retransmission to bits exhibiting a signal quality higher than others (more error resilient bits) (MSBs) in a transmission symbol and mapping bits other than the overlapping bit in the transmission bit string to bits exhibiting a signal quality lower than others (more error prone bits) (LSBs) in a transmission symbol, and the opposite case in which, as schematically illustrated in FIG. 3 (2), a transmission bit string is sent by mapping bits overlapping in the first transmission and the first-time retransmission to more error prone bits (LSBs) and mapping bits other than the overlapping bit in the transmission bit string to more error resilient bits (MSBs), the two cases are comparable in terms of the reception quality. That is, in FIGS. 3 (2) and (3), when expressing the reception quality per transmission bit (error resilience) in terms of area, that is, the area is increased as the quality increases (MSBs are wider than LSBs), the two cases have comparative areas.

However, in terms of the communication capacity, when comparing between the case in which overlapping bits are sent by mapping both to LSBs as schematically illustrated in FIG. 3 (4), and the case in which overlapping bits are sent by mapping both to MSBs as schematically illustrated in FIG. 3 (5), the communication capacity is improved (increased)

when the overlapping bit are mapped to LSBs (example of FIG. 3 (4)) because of the characteristic described above with reference to FIG. 2 in that the communication capacity is greatly improved with a smaller change in the reception quality as the signal quality is reduced. That is, in FIGS. 3 (4) and (5), when expressing the communication capacity per transmission bit in terms of area, the example depicted in FIG. 3 (4) has a wider area.

As described above, a restriction (rule) for mapping the common bits to LSBs (relatively more error prone bits) of the 16-QAM in both the first transmission and the retransmission in the first time is applied, in other words, bits having a greater transmission count are preferentially mapped to LSBs.

This can make the per-bit signal quality (likelihood) to approach to the uniform level as a result of the HARQ synthesis at the receiving party (see FIG. 3 (2)) since bits exhibiting lower signal qualities are preferentially retransmitted in a multi-level modulation signal. As a result, it is possible to increase the communication capacity.

Figure 5:
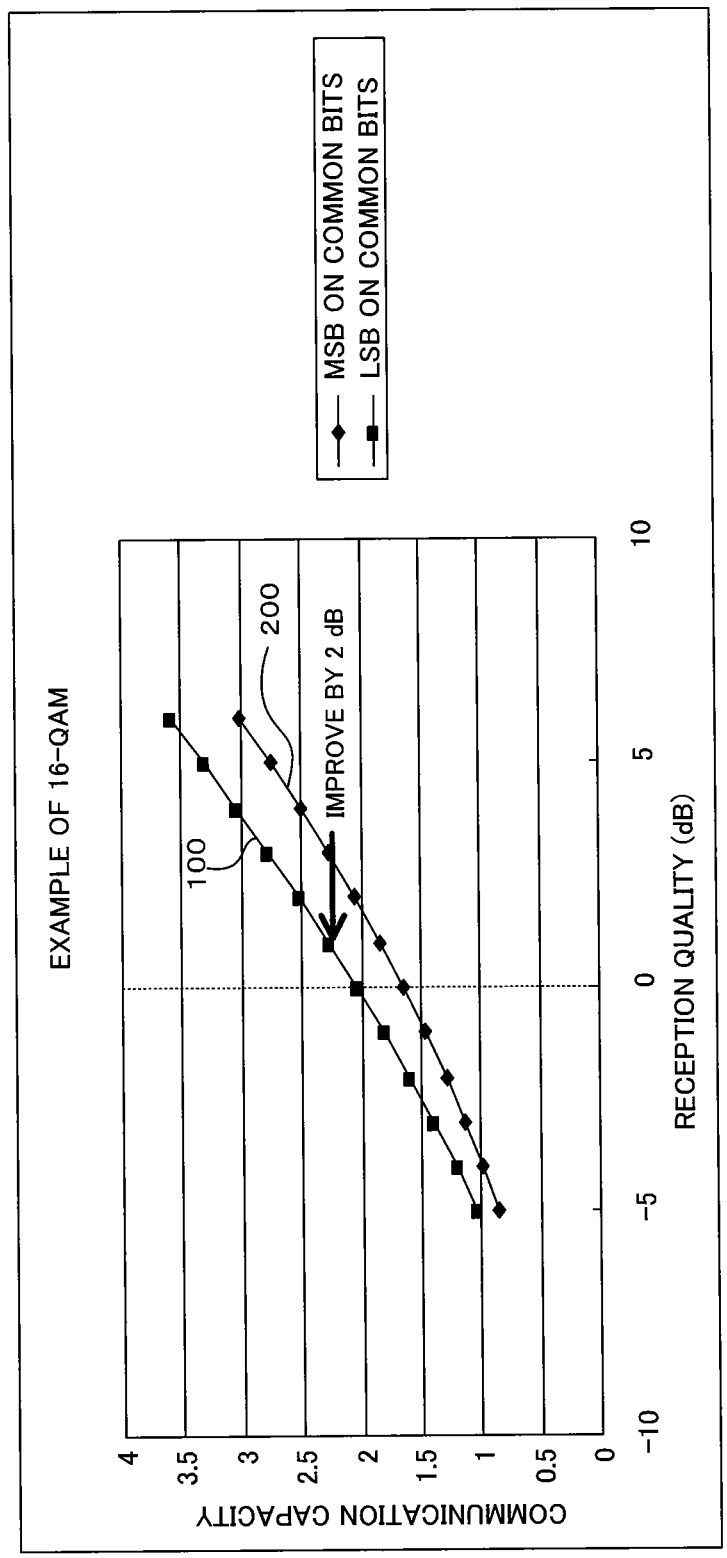
FIG. 5 is a graph illustrating one example of the relationship between the communication capacity and the reception quality by comparing between mapping of bits having greater transmission counts to lower quality bits (LSBs) and mapping to higher quality bits (MSBs)

For example, as depicted in FIG. 5, when comparing the communication capacity in the first-time retransmission between the case in which the common bits are mapped to LSBs in both the first transmission and the retransmission in the first time (see reference numeral 100) and the case in which the common bits are mapped to MSBs (see reference numeral 200), the communication capacity is increased in the former case than in the latter case.

Figure 4:
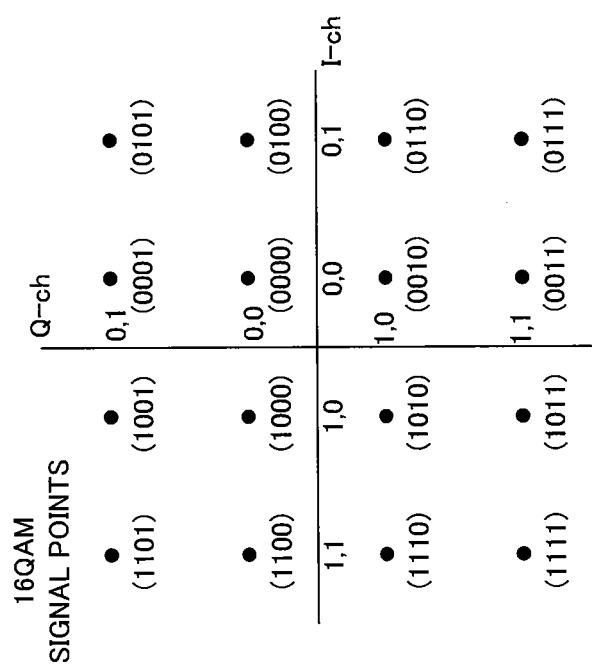
FIG. 4 is a diagram illustrating an example of the signal point arrangement in the 16-QAM that is one of multi-level modulation schemes.

Note that, when the definition of values of the I-axis and the Q-axis (MSBs and LSBs) is different from the above-described definition of the example depicted in FIG. 4, error prone bits and more error resilient bits in a bit string mapped to a transmission symbol are varied. In such case, it is possible to achieve an improvement in the communication capacity by preferentially mapping bits having a greater transmission count to more error prone bits in the transmission symbol.

Furthermore, in systems that employ multiple antennas, such as MIMO communication systems, it is also possible to achieve an improvement in the communication capacity by sending by preferentially mapping bits having a greater transmission count (or bits having a lower estimated likelihood) to transmission antennas exhibiting a lower transmission quality.

From the foregoing description, it can be understood that it is possible to achieve an improvement in the communication capacity by obtaining, by the transmitting party, information on the transmission quality, such as the per-bit transmission count or likelihood, of a transmission bit string for every transmission to the receiving party, and controlling a per-bit transmission condition for a current transmission bit string (mapping method to a multi-level modulation signal or a transmission antenna) such that the per-bit reception quality of a transmission bit string approaches evenly based on cumulative information on such transmission quality up to the last transmission.

Hereafter, embodiments will be described in detail with reference to a first embodiment in which the per-bit transmission count is obtained (counted) to control the mapping method to a multi-level modulation signal, a second embodiment in which the per-bit likelihood is obtained to multi-level modulation signal to control the mapping method to a multi-level modulation signal, a third example in which the per-bit transmission count is obtained to control the mapping method to a transmission antenna of the MIMO, and a fourth embodiment in which the per-bit likelihood is obtained to control the mapping method to a transmission antenna of the MIMO.

[2] First Embodiment

Figure 6:
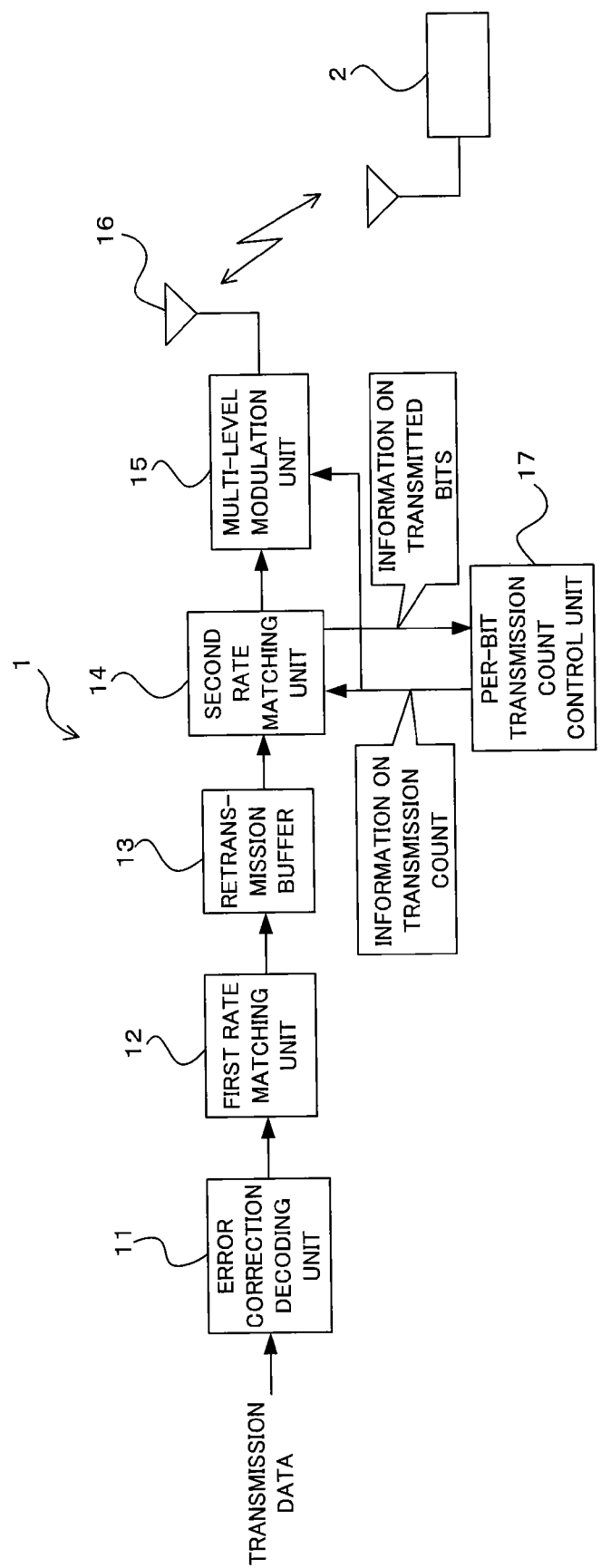
FIG. 6 is a functional block diagram illustrating the configuration of a wireless communication system of a first embodiment.

FIG. 6 is a functional block diagram illustrating the configuration of a wireless communication system of a first embodiment. The wireless communication system depicted in FIG. 6 includes a wireless transmission apparatus 1 and a wireless reception apparatus 2. The wireless transmission apparatus 1 can be applied to a transmission system of a wireless base station (BS) or a transmission system of wireless terminal (UE), and the wireless reception apparatus 2 can be applied to a reception system of the BS or a reception system of the UE, for example (this is applicable to the following embodiments).

The wireless transmission apparatus (hereinafter, simply referred to as "transmission apparatus") 1 includes an error correction decoding section 11, a first rate matching processing section 12, a retransmission buffer (memory) 13, a second rate matching processing section 14, a multi-level modulation section 15, a transmission antenna 16, and a per-bit transmission count control section 17 that counts a per-bit transmission count that is one example of information on per-bit transmission.

Here, the error correction decoding section 11 is adapted to perform error correction encoding on transmission data addressed to the wireless reception apparatus 2. An example of the error correction encoding includes turbo encoding. The transmission data encoded by the error correction decoding section 11 is input to the first rate matching processing section 12.

The first rate matching processing section 12 is adapted to perform first rate matching processing (puncture processing for reducing the bits or repetition processing by repeating bits) on the transmission data to which the above-described error correction encoding is executed so that the transmission data is stored within a predetermined region in the retransmission buffer 13. The transmission data on which the rate matching processing is performed by the first rate matching processing section 12 is input to the retransmission buffer 13.

The retransmission buffer 13 is adapted to store the transmission data (transmission bit string) that undergoes the above-described rate matching processing for retransmission. In response to receiving an NACK signal from a reception apparatus 2 indicative of a reception error, the stored transmission data is read according to a control by a retransmission control section (not illustrated) and is input into the second rate matching processing section 14.

The second rate matching processing section 14 is adapted to perform second rate matching processing (puncture processing for cutting out the bits or repetition processing by repeating bits) on the transmission data input from the retransmission buffer 13 so as to adjust the transmission data into a data length (bit count) so that the transmission data is accommodated within a predetermined region in a wireless frame. By means of such two-stage rate matching processing, the encoding rate of the transmission data can be flexibly adjusted. The transmission data that undergoes the rate matching processing by the second rate matching processing section 14 is input to the multi-level modulation section 15.

The multi-level modulation section 15 is adapted to map the transmission data (transmission bit string) that undergoes the above-described second rate matching processing to a multi-level modulation signal (symbol), such the one of as 16-QAM, thereby amplitude phase keying. In the case of the 16-QAM, one symbol is made of four bits, which results in the signal point arrangement or bit arrangement illustrated in FIG. 4. The multi-level modulation signal obtained by the multi-level modulation section 15 is input into the transmission antenna 16.

The transmission antenna 16 is adapted to send the signal (multi-level modulation signal) that undergoes the above-described modulation by the multi-level modulation section 15 to the wireless reception apparatus (hereinafter, simply referred to as "reception apparatus") 2 as a wireless signal (wireless frame). Note that, in FIG. 6, a DA converter that DA-converts a transmission bit string, a frequency converter that performs frequency conversion on a multi-level modulation signal into a wireless signal (upconversion), a power amplifier that converts a multi-level modulation signal into a predetermined transmission power, or the like, are omitted from the illustration. This also applies to the second or later embodiments.

The per-bit transmission count control section (per-bit transmission count counting section, symbol mapping control section) 17 is adapted to, for a transmission bit string having a predetermined size that is temporarily stored in the retransmission buffer 13, counts and stores information on per-bit transmissions (transmission count) for each transmission opportunity, and to control processing of the second rate matching processing section 14 and the multi-level modulation section 15 such that a bit having a greater transmission count up to present in the present transmission is preferentially mapped to a more error prone bit (LSB) in a transmission symbol.

Figure 7:
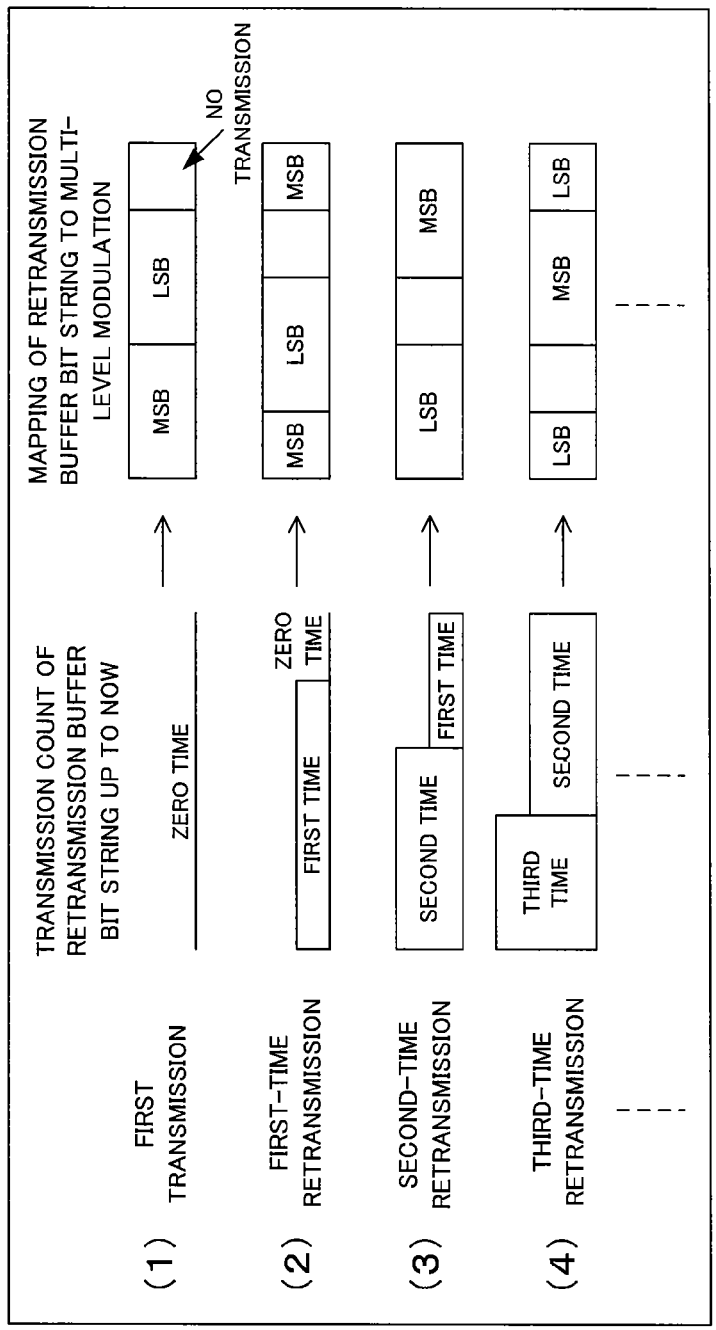
FIG. 7 is a schematic diagram illustrating a transmission method (mapping method) in the wireless communication system depicted in FIG. 6.

That is, the per-bit transmission count control section 17 preferentially maps a bit having a smaller transmission count up to present to a bit having a lower error resilience (MSB) in the transmission symbol for each retransmission processing, thereby facilitating mapping of a bit having a greater transmission count to a more error prone bit (LSB) in the transmission symbol, as schematically illustrated in FIG. 7, for example.

In other words, it is facilitated that a bit having a smaller transmission count up to present is mapped such that the transmission quality is improved, and a bit having a greater transmission count up to present is mapped such that the transmission quality is reduced.

This is equivalent to controlling symbol mapping of multi-level modulation such that the per-bit signal quality (likelihood) of an HARQ-synthesized result using the above-described transmission bit string received by the reception apparatus 2 approaches evenly.

Thus, it can be regarded that the per-bit transmission count control section 17 functions as an obtainment unit that obtains information on a per-bit transmission of a transmission bit string for every transmission to the reception apparatus 2, and a control unit that controls a per-bit transmission method of the current transmission bit string based on cumulative information on the above-described transmissions up to the last transmission obtained by the obtainment unit such that the per-bit transmission quality of the transmission bit string approaches evenly.

Note that counting the per-bit transmission count (that is, obtaining the per-bit transmission quality) can be achieved by counting the transmission count for each bit storage location (memory address) in the transmission buffer 13, for example.

In the example depicted in FIG. 7, (1) since the transmission counts up to present for all transmission bits stored in the retransmission buffer 13 are all zero upon the first transmission, the per-bit transmission count control section 17 does not apply the above-described rule and performs normal mapping (for example, such as evenly mapping to MSBs and LSBs).

(2) Upon the first-time retransmission thereafter, the per-bit transmission count control section 17 preferentially maps, in the transmission bit string, from bits having a transmission count up to present of zero to one of MSBs of a predetermined bit count. If there are any bits having the same transmission count which cannot be mapped to MSBs, such bits are mapped to LSBs. Bits (retransmission bits) having a transmission count of one are mapped to MSBs if there is any remaining MSBs; otherwise, the bits that cannot be mapped to MSBs are mapped to LSBs. If there is no remaining MSB, bits having a transmission count up to present of one is all mapped to LSBs.

(3) Upon the second retransmission, the per-bit transmission count control section 17 preferentially maps, in the transmission bit string, bits having a smaller transmission count up to present (one) to MSBs. If there are any bits having the same transmission count which cannot be mapped to MSBs, such bits are mapped to LSBs. Bits having a greater transmission count of two are mapped to MSBs when there is any remaining MSB, and the bits that cannot be mapped to MSBs are mapped to LSBs. If there is no remaining MSB, bits having a transmission count up to present of two are all mapped to LSBs.

(4) Upon the third retransmission, the per-bit transmission count control section 17 preferentially maps, in the transmission bit string, bits having a transmission count up to present of two to MSBs. If there are any bits having the same transmission count which cannot be mapped to MSBs, such bits are mapped to LSBs. Bits having a greater transmission count of three are mapped to MSBs when there is any remaining MSB, and the bits that cannot be mapped to MSBs are mapped to LSBs. If there is no remaining MSB, bits having a transmission count of three are all mapped to LSBs.

Thereafter, the per-bit transmission count control section 17 preferentially maps bits having a smaller transmission count up to present to MSBs in the manner similar to those described above, which, in turn, results in facilitating mapping of bits having a greater transmission count to LSBs. Note that bits having greater transmission counts may be preferentially mapped to LSBs, as being opposite to the case of the example as set forth above.

As described above, when the transmission apparatus 1 carries out retransmission processing in response to reception of a NACK from the reception apparatus 2, it is possible to achieve an improvement in the communication capacity by preferentially mapping bits having a smaller transmission count up to present in a multi-level modulation signal to MSBs since it is possible to make the per-bit signal quality (likelihood) after an HARQ synthesis to approach evenly.

Note that another rule may be adapted in which the same transmission bit is arranged in an LSB and is sent in successive transmissions (the $N^{th}$ transmission, the $N+1^{th}$ transmission).

[3] Second Embodiment

Figure 8:
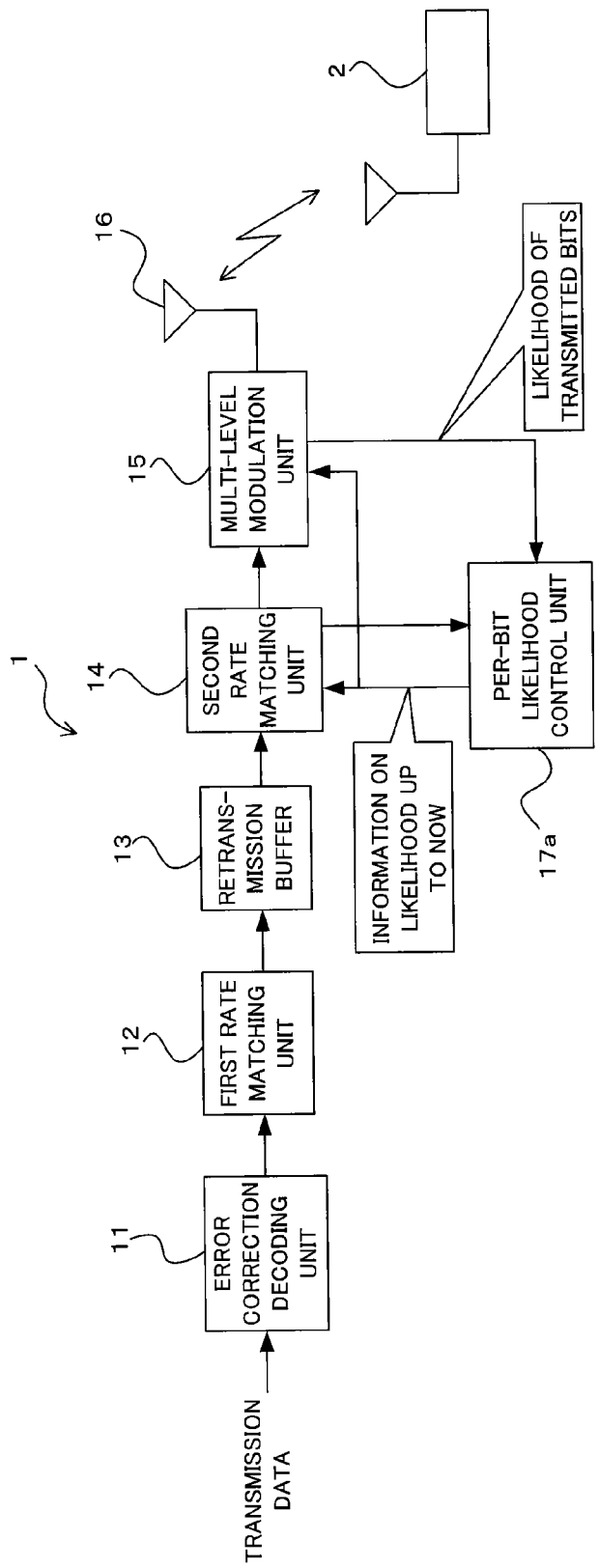
FIG. 8 is a functional block diagram illustrating the configuration of a wireless communication system of a second embodiment.

FIG. 8 is a functional block diagram illustrating the configuration of a wireless communication system of a second embodiment. The wireless communication system depicted in FIG. 8 also includes a wireless the transmission apparatus 1 and a wireless reception apparatus 2.

In addition to including an error correction decoding section 11, a first rate matching processing section 12, a retransmission buffer (memory) 13, a second rate matching processing section 14, a multi-level modulation section 15, and a transmission antenna 16 that are similar to those depicted in FIG. 6, the wireless the transmission apparatus 1 also includes a per-bit likelihood control section 17a that obtains a per-bit likelihood as one example of information on a per-bit transmission.

Here, the per-bit likelihood control section (per-bit likelihood obtaining section, symbol mapping control section) 17a is adapted to, for a transmission bit string having a predetermined size that is temporarily stored in the retransmission buffer 13, obtain and cumulatively store information on a per-bit likelihood (estimated likelihood at the reception apparatus 2) from the multi-level modulation section 15 for each transmission opportunity, and to control processing of the second rate matching processing section 14 and the multi-level modulation section 15 such that a bit having a greater synthetic likelihood up to present in the present transmission is preferentially mapped to a bit having a lower likelihood (LSB).

Figure 10:
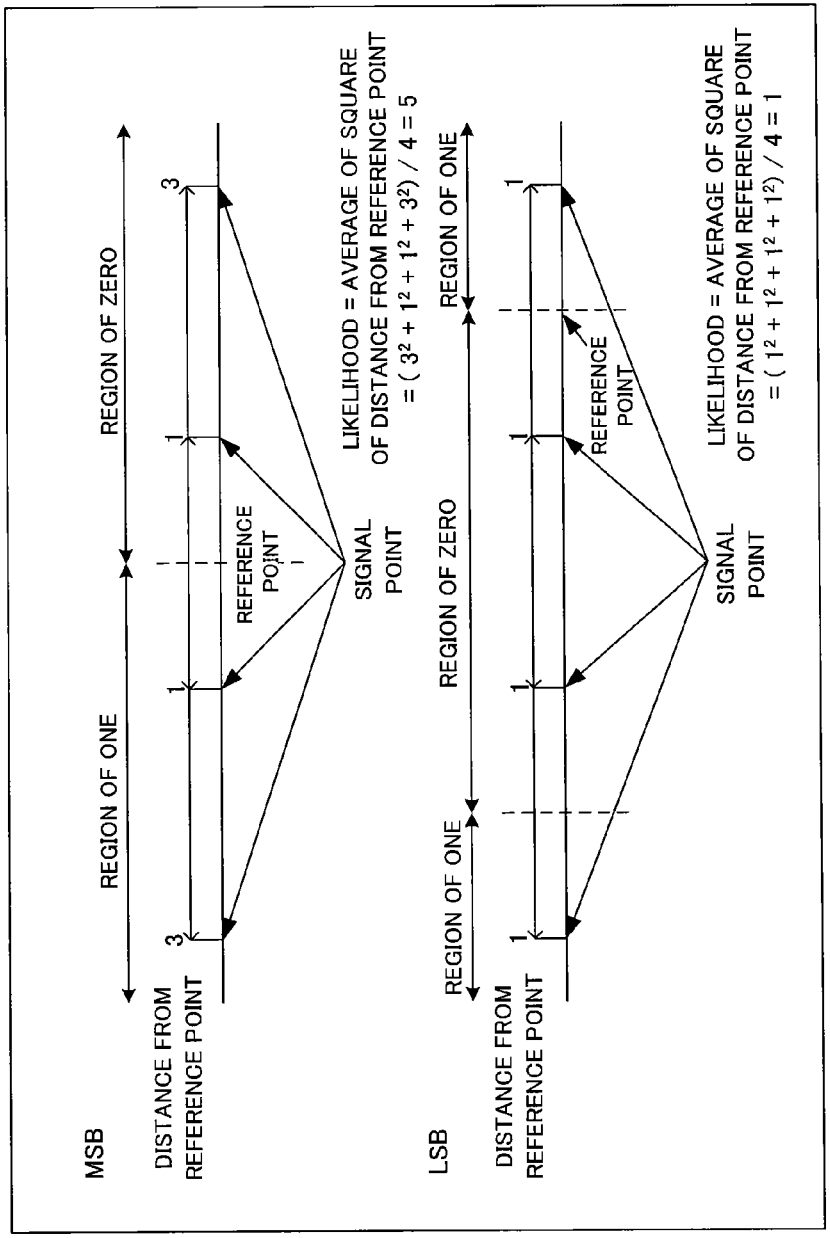
FIG. 10 is a schematic diagram illustrating another transmission method (mapping method) in the wireless communication system depicted in FIG. 8.

The likelihood is information indicative of the confidence (error resilience) whether each bit is zero or one, and a higher likelihood means a higher confidence (a higher signal quality). For example, in the case of the 16-QAM, as depicted in as FIG. 10, the likelihood can be determined as the average of the squares of the distances from the reference point on the I-Q plane (the determination axis upon an error correction decoding at the reception apparatus 2). In the example of FIG. 10, the likelihood of MSBs is $(3^2+1^2+1^2+3^2)/4=5$, and the likelihood of LSBs is $(1^2+1^2+1^2+1^2)/4=1$ when the signal point arrangement in FIG. 4 is assumed. It can be considered that MSBs have a higher likelihood and are more error resilient (bits exhibiting a higher signal quality) since MSBs are farther from the reference point.

Accordingly, the per-bit likelihood control section 17a will carry out mapping of bits that have a higher synthetic likelihood up to present and have a higher signal quality in the present transmission to bits having a lower likelihood (LSBs). Note that likelihood values described above may be determined as logarithmic likelihood values.

Figure 9:
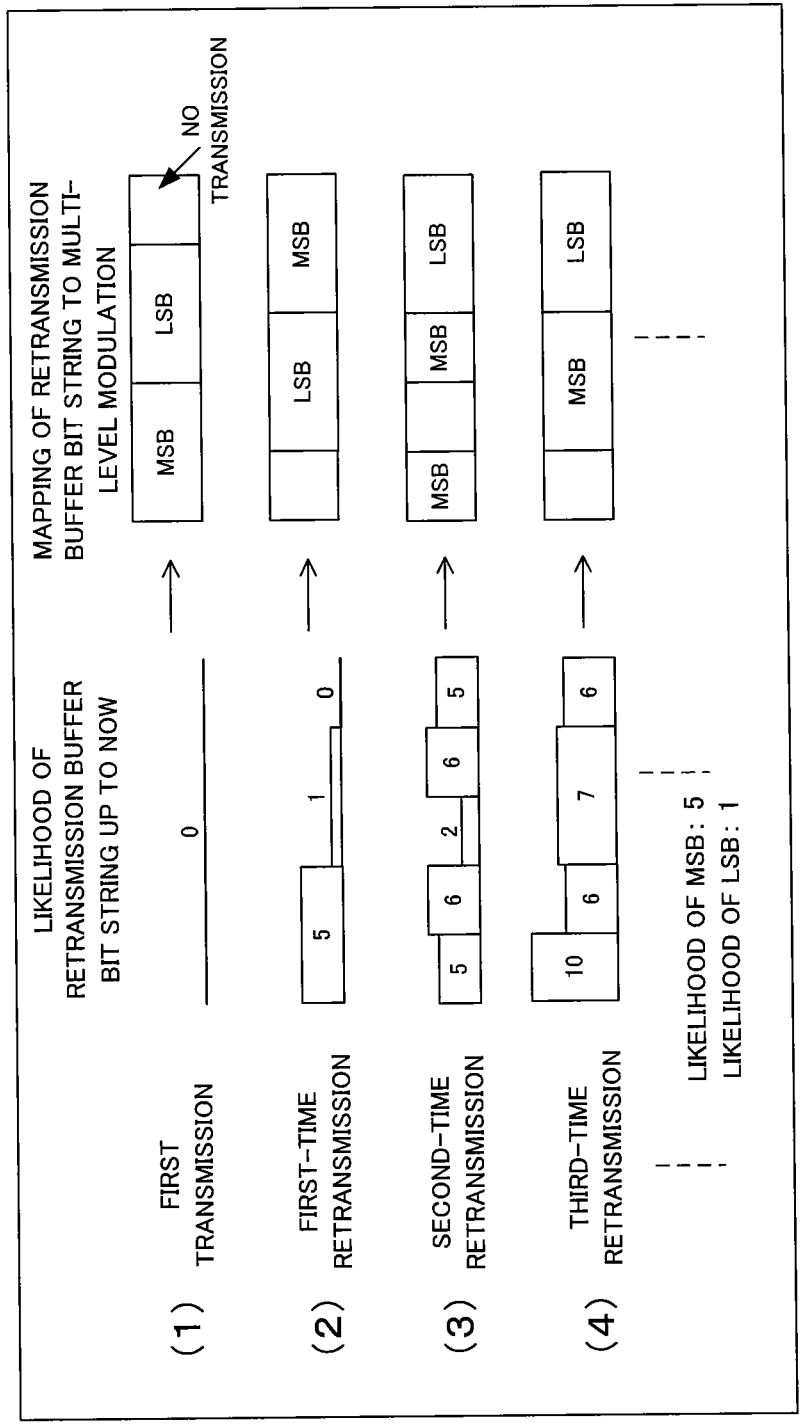
FIG. 9 is a schematic diagram illustrating a transmission method (mapping method) in the wireless communication system depicted in FIG. 8.

That is, as schematically illustrated in FIG. 9, for example, the per-bit likelihood control section 17a preferentially maps bits having smaller synthetic likelihoods up to present to bits having a higher likelihood (MSBs) for each retransmission processing (transmission opportunity), thereby facilitating mapping of bits having higher synthetic likelihoods to bits having a lower likelihood (LSBs).

In other words, it is facilitated that a bit having a smaller synthetic likelihood up to present is mapped such that the transmission quality is improved, and a bit having a greater synthetic likelihood up to present is mapped such that the transmission quality is reduced.

This is equivalent to controlling symbol mapping of multi-level modulation such that the per-bit estimated likelihood (reception quality) of an HARQ-synthesized result using the above-described transmission bit string received by the reception apparatus 2 approaches evenly.

Thus, it can be regarded that the per-bit likelihood control section 17a functions as an obtainment unit that obtains information on a per-bit transmission of a transmission bit string for every transmission to the reception apparatus 2, and a control unit that controls a per-bit transmission method of the current transmission bit string based on cumulative information on the above-described transmissions up to the last transmission obtained by the obtainment unit such that the per-bit transmission quality of the transmission bit string approaches evenly.

In the example depicted in FIG. 9, (1) since the transmission counts up to present for all transmission bits stored in the retransmission buffer 13 are all zero upon the first transmission, the per-bit likelihood control section 17a does not apply the above-described rule and performs normal mapping. For example, bits are evenly mapped to MSBs and LSBs.

(2) Upon the first-time retransmission thereafter, the per-bit likelihood control section 17a preferentially maps, in the transmission bit string, from bits having a synthetic likelihood up to present of zero to one of MSBs of a predetermined bit count. If there is any bits having the same synthetic likelihood which cannot be mapped to MSBs, the bits are mapped to LSBs. Bits having a synthetic likelihood up to present of one are mapped to MSBs if there is any remaining MSBs; otherwise, the bits that cannot be mapped to MSBs are mapped to LSBs. Bits having a synthetic likelihood up to present of five are mapped to MSBs if there is any remaining MSBs; otherwise, the bits that cannot be mapped to MSBs are mapped to LSBs. If there is no remaining MSB, bits having a greater synthetic likelihood up to present (one or five) is all mapped to LSBs.

(3) Upon the second retransmission, the per-bit likelihood control section 17a preferentially maps, in the transmission bit string, bits having a synthetic likelihood up to present of two to MSBs. If there is any bits having the same synthetic likelihood which cannot be mapped to MSBs, the bits are mapped to LSBs. Bits having a synthetic likelihood up to present of greater than two (five or six) are mapped to MSBs if there is any remaining MSBs; otherwise, the bits that cannot be mapped to MSBs are mapped to LSBs. If there is no remaining MSB, bits having a greater synthetic likelihood up to present of five or six is all mapped to LSBs.

(4) Upon the third retransmission, the per-bit likelihood control section 17a preferentially maps, in the transmission bit string, bits having a synthetic likelihood up to present of six to MSBs. If there is any bits having the same synthetic likelihood which cannot be mapped to MSBs, the bits are mapped to LSBs. Bits having a synthetic likelihood up to present of greater than two (seven or ten) are mapped to MSBs if there is any remaining MSBs; otherwise, the bits that cannot be mapped to MSBs are mapped to LSBs. If there is no remaining MSB, bits having a greater synthetic likelihood up to present of seven or ten is all mapped to LSBs.

Thereafter, the per-bit likelihood control section 17a preferentially maps bits having a smaller synthetic likelihood up to present to MSBs having a higher likelihood in the manner similar to those described above, which, in turn results in facilitating mapping of bits having a greater synthetic likelihood to LSBs having a smaller likelihood. Note that bits having greater synthetic likelihoods may be preferentially mapped to LSBs, as being opposite to the case of the example as set forth above.

As described above, when the transmission apparatus 1 carries out retransmission processing in response to reception of a NACK from the reception apparatus 2, it is possible to achieve an improvement in the communication capacity by preferentially mapping bits having a synthetic likelihood count up to present in a multi-level modulation signal to MSBs since it is possible to make the per-bit signal quality (likelihood) after an HARQ synthesis to approach evenly.

Figure 11:
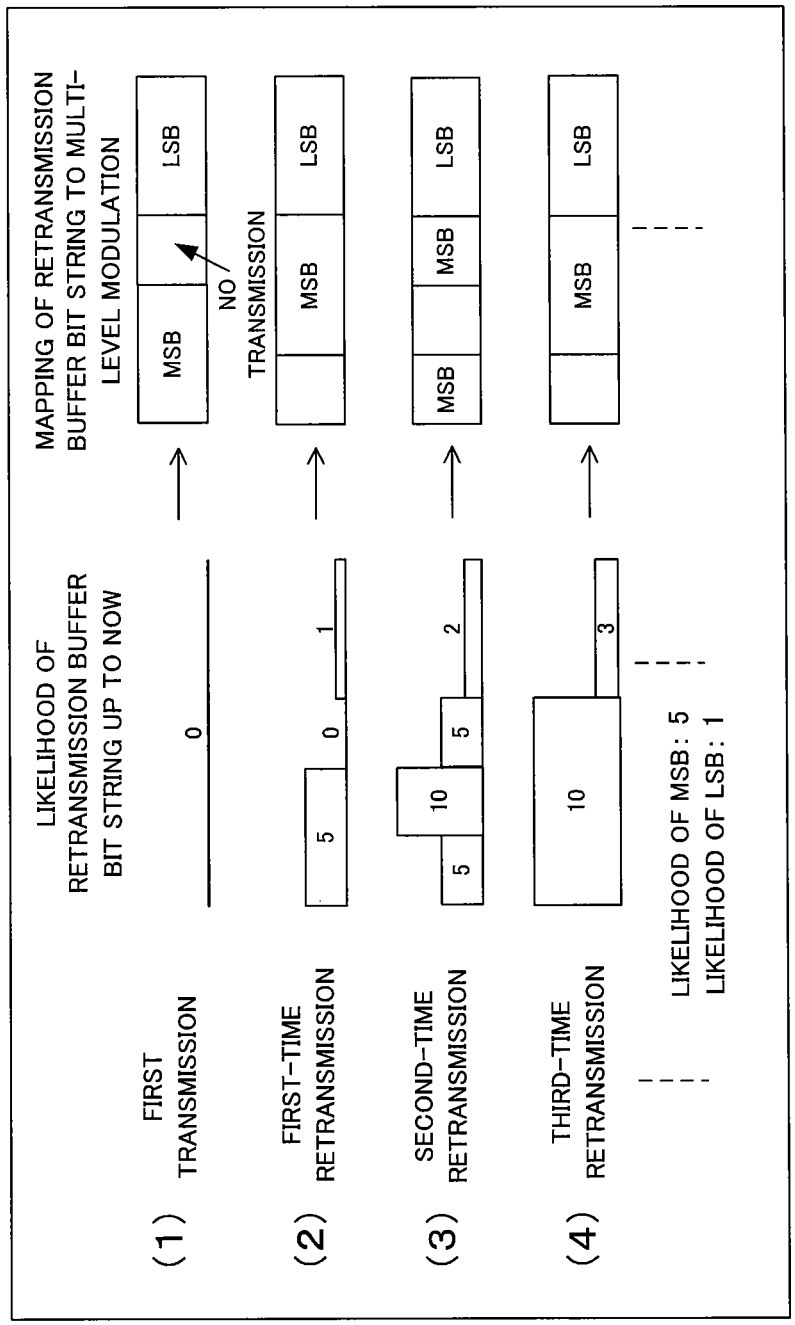
FIG. 11 is a diagram illustrating per-bit likelihoods.

Note that the per-bit likelihood control section 17a may divide a transmission bit string in the retransmission buffer 13 into multiple groups in suitable lengths, and preferentially map bits having a smaller synthetic likelihood up to present within such a group to MSBs, as schematically illustrated in FIG. 11, for example. In the example in FIG. 11, bit groups mapped to LSBs are fixed, and bits having a smaller synthetic likelihood up to present within the remaining bit groups are preferentially mapped to MSBs. Note that bit groups mapped to MSBs may be fixed.

By performing such mapping control by means of grouping, it is possible to reduce the number of bits used for comparing magnitudes of synthetic likelihoods even when the unit (size) of transmission bit strings in the retransmission buffer 13 is increased. Accordingly, mapping control can be simplified, thereby reducing the device size, power consumption, or the like. Further advantages can be obtained by fixing bit groups to be mapped to LSBs or MSBs, as the example depicted in FIG. 11.

Note that grouping as described above may be applied to the first embodiment. In addition, grouping may also be applied to the third and fourth embodiments that will be described later.

In addition, for information on a per-bit likelihood, likelihood information that is obtained upon an error correction decoding at the reception apparatus 2 may be fed back to the per-bit likelihood control section 17a in the transmission apparatus 1.

In this case, the transmission apparatus 1 can carry out the above-described per-bit mapping control on a transmission bit string based on likelihoods in accordance with the actual wireless propagation environment from the transmission apparatus 1 to the reception apparatus 2. Accordingly, optimization of the communication capacity can be realized which is responsive to variation in the wireless propagation environment.

[4] Third Embodiment

Figure 12:
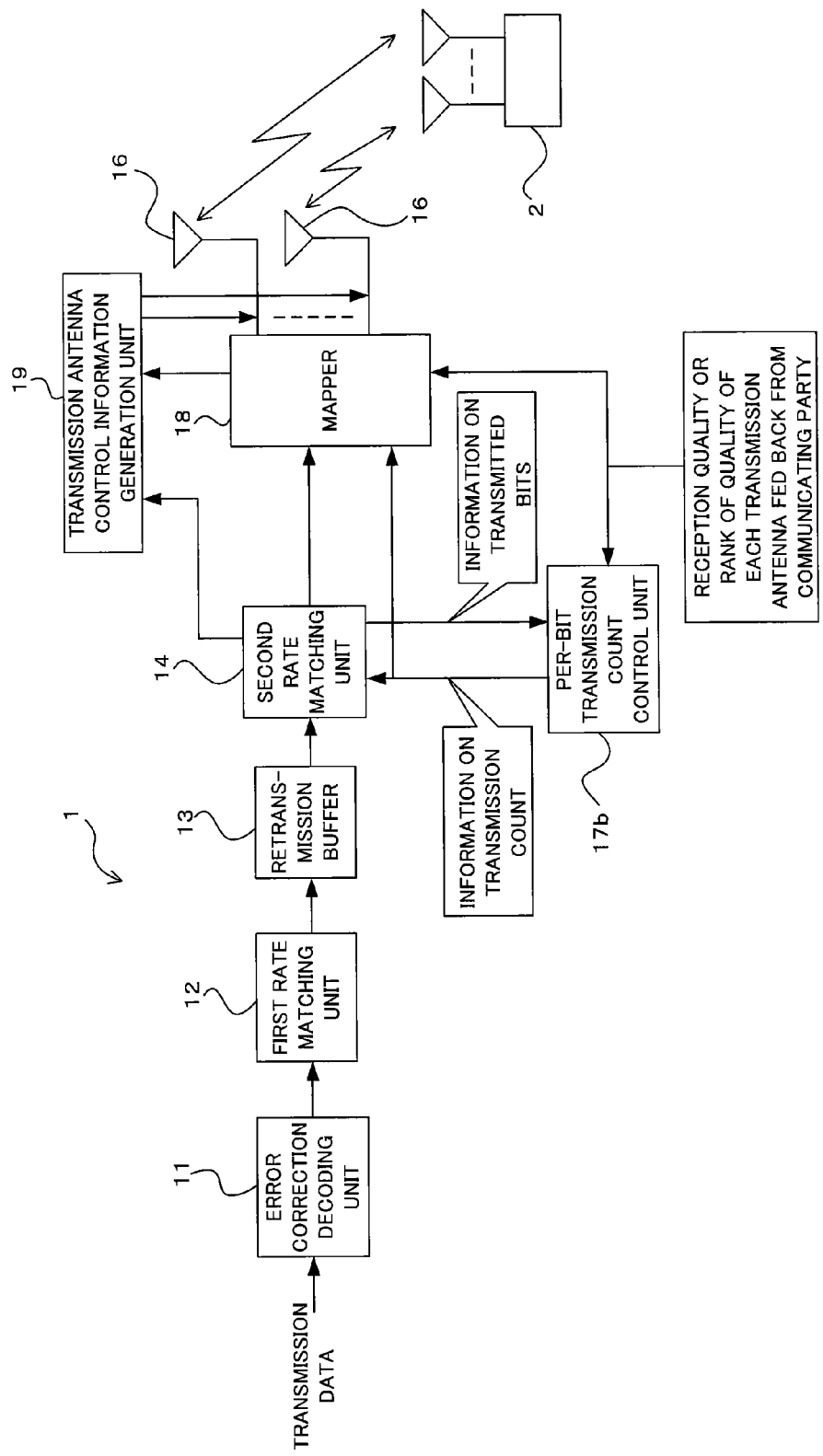
FIG. 12 is a functional block diagram illustrating the configuration of a wireless communication system of a third embodiment.

FIG. 12 is a functional block diagram illustrating the configuration of a wireless communication system of a third embodiment. The wireless communication system depicted in FIG. 12 includes an MIMO transmitter as a wireless transmission apparatus 1 and an MIMO receiver as a wireless reception apparatus 2.

In addition to including an error correction decoding section 11, a first rate matching processing section 12, a retransmission buffer (memory) 13, and a second rate matching processing section 14 that are similar to those depicted in FIG. 6, the MIMO transmitter 1 also includes a per-bit transmission count control section 17b that counts a per-bit transmission count as one example of information on a per-bit transmission, multiple antennas 16, a mapper 18, and a transmission antenna control information generation section 19.

Here, the mapper 18 includes a function that separates transmission data (a transmission bit string) that undergoes the rate matching processing by the second rate matching processing section 14, to transmission streams for the transmission antennas 16, and carries out mapping to a multi-level modulation signal (transmission symbol), such as one in the QPSK or the 16-QAM for each transmission stream.

The per-bit transmission count control section (per-bit transmission count counting section, antenna mapping control section) 17b is adapted to, for a transmission bit string having a predetermined size that is temporarily stored in the retransmission buffer 13, counts and stores a transmission count for each transmission opportunity, and to control the second rate matching processing section 14 and the mapper 18 such that a bit having a greater transmission count up to present in the present transmission is preferentially mapped to a transmission antenna 16 (channel) exhibiting a lower transmission quality.

The transmission quality for each transmission antenna 16 (channel) is determined (identified) based on transmission antenna quality information fed back (notified) from the MIMO receiver 2 (information indicative of which transmission antenna 16 has a higher transmission quality), for example. The transmission antenna quality information may be information indicative of the quality of each transmission antenna 16, or may be information indicative of the ranking of qualities. In addition, the information may not be one on all of the transmission antennas 16, but may be limited for a part of transmission antennas 16 used for transmission.

Such transmission antenna quality information can be determined at the MIMO receiver 2 based on the received powers of known signals, such as pilot signals, which are transmitted from different transmission antennas 16 at different times from the MIMO transmitter 1, or are transmitted in parallel for each transmission antenna 16, for example.

Figure 13:
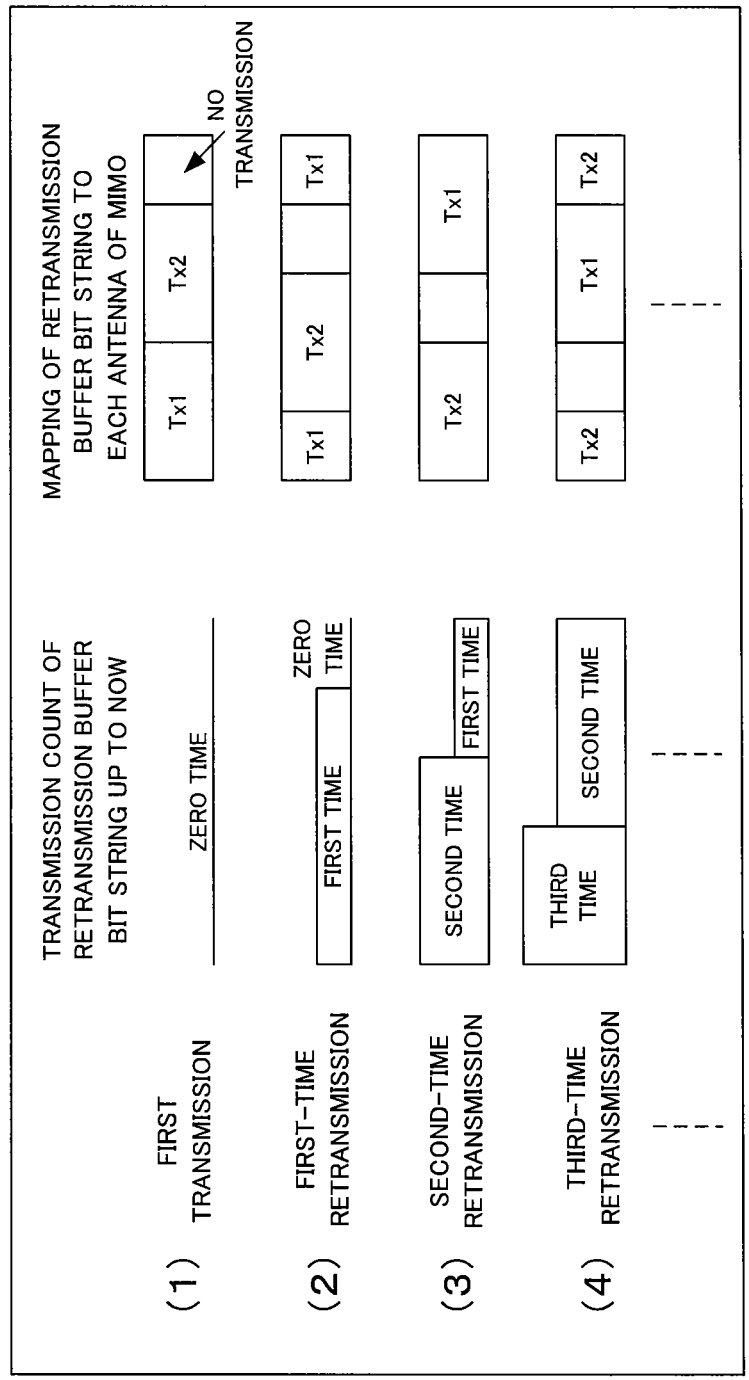
FIG. 13 is a schematic diagram illustrating a transmission method (mapping method) in the wireless communication system depicted in FIG. 12.

In addition, the per-bit transmission count control section 17b preferentially maps, for each retransmission processing (transmission opportunity), bits having a smaller transmission count up to present to a transmission antenna 16 (channel) exhibiting a higher transmission quality, as schematically illustrated in FIG. 13, for example. This, in turn, results in facilitating mapping of bits having a greater transmission count to a transmission antenna 16 exhibiting a lower transmission quality.

In other words, it is facilitated that a bit having a smaller transmission count up to present is mapped such that the transmission quality is improved, and a bit having a greater transmission count up to present is mapped such that the transmission quality is reduced.

This is equivalent to controlling symbol mapping to the transmission antennas 16 (channels) such that the per-bit estimated likelihood (reception quality) of an HARQ-synthesized result using the above-described transmission bit string received by the MIMO receiver 2 approaches evenly.

Thus, it can be regarded that the per-bit transmission count control section 17b functions as an obtainment unit that obtains information on a per-bit transmission of a transmission bit string for every transmission to the MIMO receiver 2, and a control unit that controls a per-bit transmission method of the current transmission bit string based on cumulative information on the above-described transmissions up to the last transmission obtained by the obtainment unit such that the per-bit transmission quality of the transmission bit string approaches evenly.

The example depicted in FIG. 13 assumes the case in which there are two transmission antennas 16 (Tx1 and Tx2) and the transmission antenna Tx1 has a higher transmission quality than that of the transmission antenna Tx2. (1) Since transmission counts up to present for all bits stored in the retransmission buffer 13 are all zero upon the first transmission, the per-bit transmission count control section 17b does not apply the above-described rule and performs normal mapping. For example, bits are evenly mapped to the transmission antennas Tx1 and Tx2.

(2) Upon the first-time retransmission thereafter, the per-bit transmission count control section 17b preferentially maps a predetermined number of bits, in the transmission bit string, from bits having the smallest transmission count up to present (zero) to the transmission antenna Tx1 exhibiting a higher transmission quality. If there is any bits having the same transmission count (zero) which cannot be mapped to the transmission antenna Tx1, the bits are mapped to a transmission antenna 16 exhibiting a lower transmission quality. Bits having a transmission count up to present of one are mapped to the transmission antenna Tx1 if the transmission antenna Tx1 is capable of being mapped, and the bits that cannot be mapped to the transmission antenna Tx1 are mapped to the transmission antenna Tx2. If the transmission antenna Tx1 is not capable of being mapped, bits having a transmission count up to present of two are all mapped to LSBs.

(3) Upon the second retransmission, the per-bit transmission count control section 17b preferentially maps, in the transmission bit string, bits having the smallest transmission count up to present (one) to the transmission antenna Tx1. If there is any bits having the same transmission count (one)

which cannot be mapped to the transmission antenna Tx1, the bits are mapped to the transmission antenna Tx2. Bits having a transmission count up to present of two are mapped to the transmission antenna Tx1 if the transmission antenna Tx1 is capable of being mapped, and the bits that cannot be mapped to the transmission antenna Tx1 are mapped to the transmission antenna Tx2. If the transmission antenna Tx1 is not capable of being mapped, bits having a transmission count up to present of two are all mapped to LSBs.

(4) Upon the third retransmission, the per-bit transmission count control section 17b preferentially maps, in the transmission bit string, bits having the smallest transmission count up to present (two) to the transmission antenna Tx1. If there is any bits having the same transmission count (two) which cannot be mapped to the transmission antenna Tx1, the bits are mapped to the transmission antenna Tx2. Bits having a transmission count up to present of three are mapped to the transmission antenna Tx1 if the transmission antenna Tx1 is capable of being mapped, and the bits that cannot be mapped to the transmission antenna Tx1 are mapped to the transmission antenna Tx2. If the transmission antenna Tx1 is not capable of being mapped, bits having a transmission count of three are all mapped to the transmission antenna Tx2.

Thereafter, the per-bit transmission count control section 17b preferentially maps bits having a smaller transmission count up to present to the transmission antenna Tx1 exhibiting a higher transmission quality in the manner similar to those described above, which, in turn, results in facilitating mapping of bits having a greater transmission count to the transmission antenna Tx2 exhibiting a lower transmission quality. Note that bits having greater transmission counts may be preferentially mapped to the transmission antenna Tx2 exhibiting a lower transmission quality, as being opposite to the case of the example as set forth above.

As described above, when the MIMO transmitter 1 carries out retransmission processing in response to reception of a NACK from the MIMO receiver 2, it is possible to achieve an improvement in the communication capacity by mapping bits having a smaller transmission count up to present in a multi-level modulation signal to a transmission antenna 16 exhibiting a higher transmission quality since it is possible to make the per-bit signal quality (likelihood) after an HARQ synthesis to approach evenly.

Note that the transmission antenna control information generation section 19 is adapted to generate information (transmission antenna control information) indicative of which transmission antenna 16 has a higher transmission quality and thus a bit is mapped to by the per-bit likelihood control section 17c (mapping method).

The information is sent from the transmission antennas 16 to the MIMO receiver 2 as control information that is accompanied with transmission data, for example. By notifying the mapping method from the MIMO transmitter 1 to the MIMO receiver 2 in this manner, even when such feedback information (transmission antenna quality information) cannot be received properly, such as due to an reception error at the MIMO transmitter 1 caused by the propagation environment, the MIMO receiver 2 can carry out appropriate demapping processing, demodulation processing, decode processing on a reception signal based on the transmission antenna control information.

Note that the transmission antenna control information may be information indicative of the ranking of transmission qualities of the transmission antennas 16, similar to the feedback information from the MIMO receiver 2 described above.

[5] Fourth Embodiment

Figure 14:
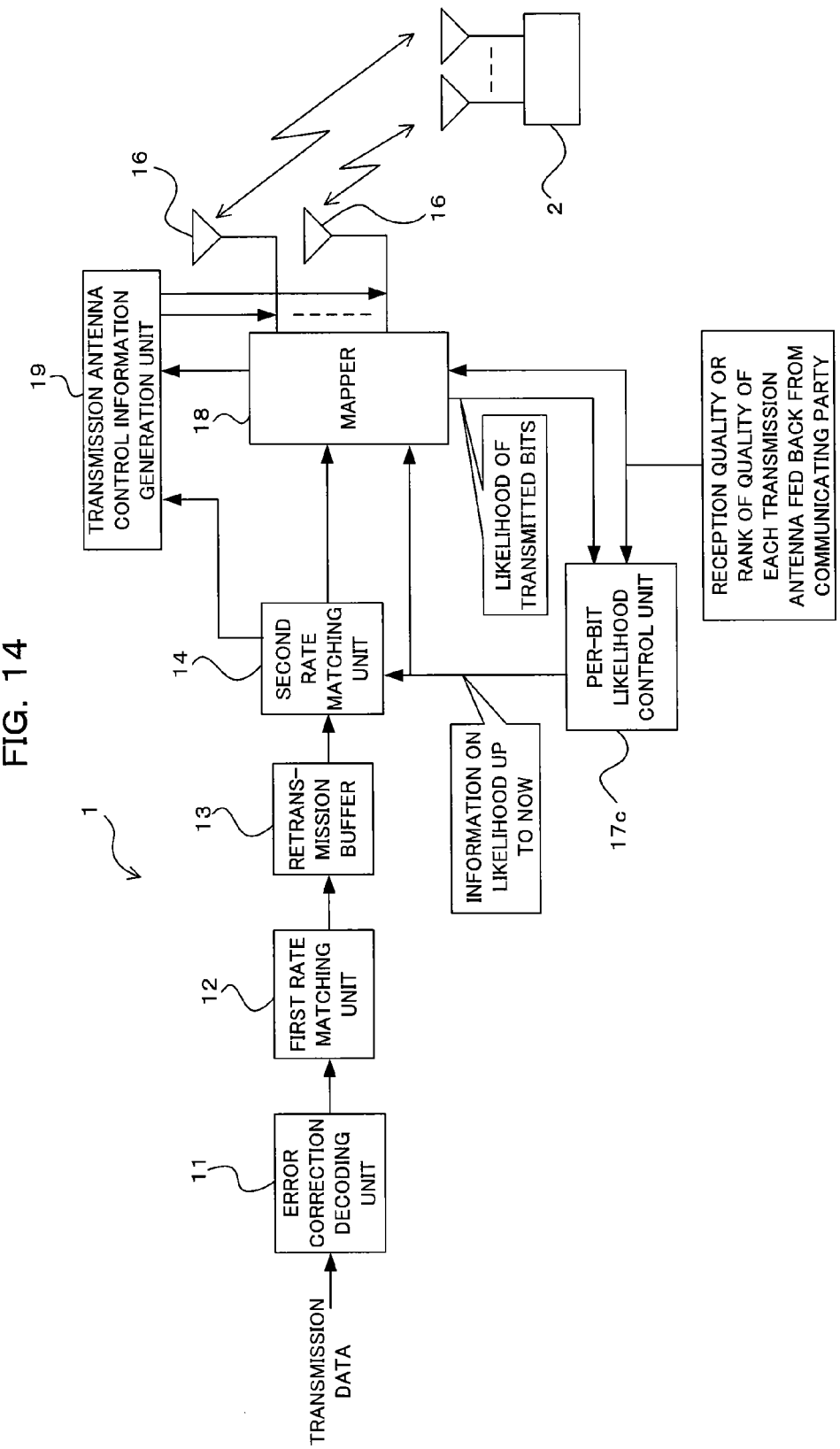
FIG. 14 is a functional block diagram illustrating the configuration of a wireless communication system of a fourth embodiment.

FIG. 14 is a functional block diagram illustrating the configuration of a wireless communication system of a fourth embodiment. The wireless communication system depicted in FIG. 14 includes an MIMO transmitter as a wireless transmission apparatus 1 and an MIMO receiver as a wireless reception apparatus 2.

In addition to including an error correction decoding section 11, a first rate matching processing section 12, a retransmission buffer (memory) 13, and a second rate matching processing section 14 that are similar to those depicted in FIG. 6, and multiple antennas 16, the mapper 18, the transmission antenna control information generation section 19 that are similar to those depicted in FIG. 12, the MIMO transmitter 1 also includes a per-bit likelihood control section 17c that obtains a per-bit likelihood as one example of information on a per-bit transmission.

Here, the per-bit likelihood control section (per-bit likelihood obtaining section, symbol mapping control section) 17c is adapted to, for a transmission bit string having a predetermined size that is temporarily stored in the retransmission buffer 13, obtain and cumulatively store information on a per-bit likelihood (estimated likelihood at the MIMO receiver 2) from the mapper 18 for each transmission opportunity, and to control the second rate matching processing section 14 and the mapper 18 such that a bit having a greater synthetic likelihood up to present in the present transmission is preferentially mapped to a transmission antenna 16 exhibiting a lower transmission quality.

Figure 15:
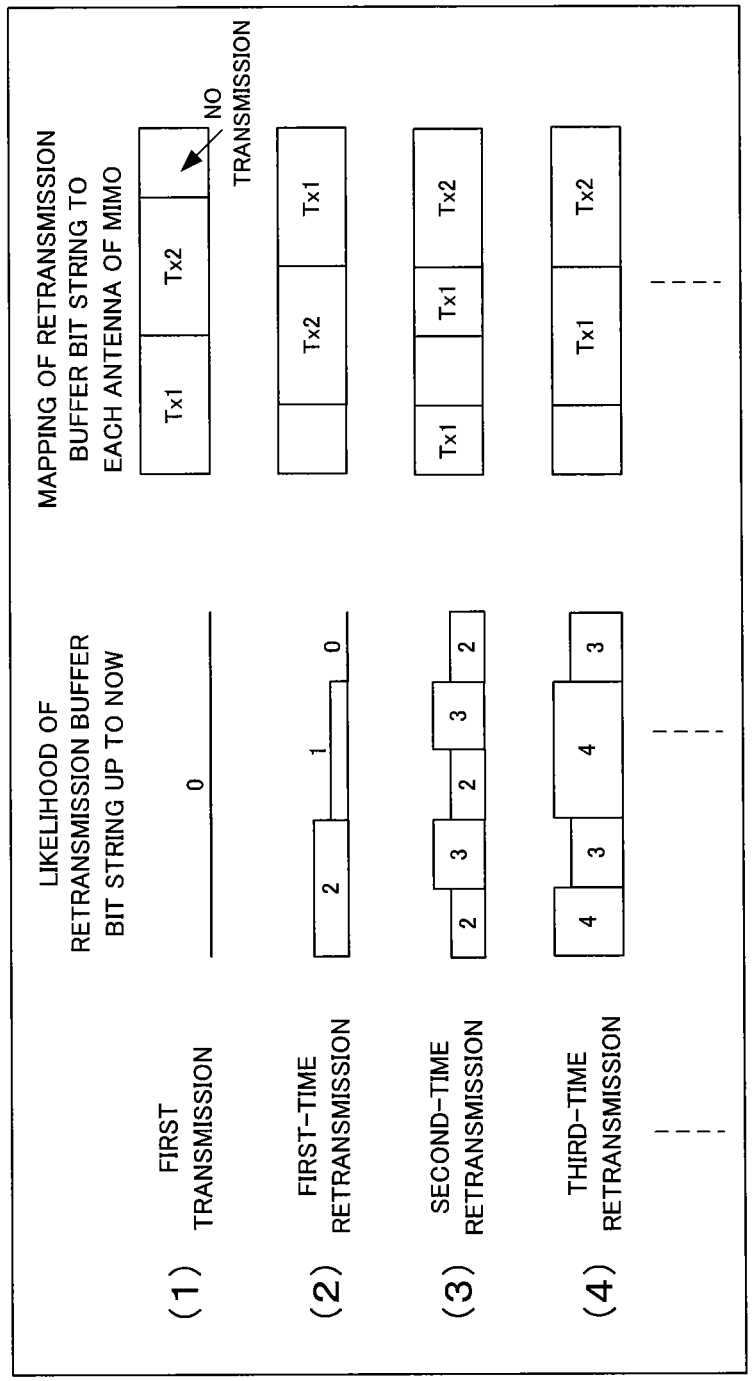
FIG. 15 is a schematic diagram illustrating a transmission method (mapping method) in the wireless communication system depicted in FIG. 14.

In addition, the per-bit likelihood control section 17c preferentially maps, for each retransmission processing (transmission opportunity), bits having a synthetic likelihood up to present to a transmission antenna 16 (channel) exhibiting a higher transmission quality, as schematically illustrated in FIG. 15, for example. This, in turn, results in facilitating mapping of bits having a greater synthetic likelihood to a transmission antenna 16 exhibiting a lower transmission quality.

In other words, it is facilitated that a bit having a smaller synthetic likelihood up to present is mapped such that the transmission quality is improved, and a bit having a greater synthetic likelihood up to present is mapped such that the transmission quality is reduced.

This is equivalent to controlling symbol mapping to the transmission antennas 16 (channels) such that the per-bit estimated likelihood (reception quality) of an HARQ-synthesized result using the above-described transmission bit string received by the MIMO receiver 2 approaches evenly.

Thus, it can be regarded that the per-bit likelihood control section 17c functions as an obtainment unit that obtains information on a per-bit transmission of a transmission bit string for every transmission to the MIMO receiver 2, and a control unit that controls a per-bit transmission method of the current transmission bit string based on cumulative information on the above-described transmissions up to the last transmission obtained by the obtainment unit such that the per-bit transmission quality of the transmission bit string approaches evenly.

In this example, the transmission quality for each transmission antenna 16 (channel) is also determined (identified) based on transmission antenna quality information fed back (notified) from the MIMO receiver 2 (information indicative of which transmission antenna 16 has a higher transmission quality), similar to the third embodiment as described above, for example. The transmission antenna quality information may be information indicative of the quality of each transmission antenna 16, or may be information indicative of the ranking of qualities. In addition, the information may not be one on all of the transmission antennas 16, but may be limited for a part of transmission antennas 16 used for transmission.

In this example, such transmission antenna quality information can also be determined at the MIMO receiver 2 based on the received powers of known signals, such as pilot signals, which are transmitted from different transmission antennas 16 at different times from the MIMO transmitter 1, or are transmitted in parallel for each transmission antenna 16.

The example depicted in FIG. 15 assumes the case in which there are two transmission antennas 16 (Tx1 and Tx2) and the transmission antenna Tx1 has a higher transmission quality than that of the transmission antenna Tx2 (the likelihood of the transmission antenna Tx1 is two, and the likelihood of the transmission antenna Tx2 is one). (1) Since transmission counts up to present for all transmission bits stored in the retransmission buffer 13 are all zero upon the first transmission, the per-bit likelihood control section 17c does not apply the above-described rule and performs normal mapping. For example, bits are evenly mapped to the transmission antennas Tx1 and Tx2.

(2) Upon the first-time retransmission thereafter, the per-bit likelihood control section 17c preferentially maps, in the transmission bit string, from bits having the smallest synthetic likelihood up to present (zero) to the transmission antenna Tx1 exhibiting a higher transmission quality. If there is any bits having the same synthetic likelihood (zero) which cannot be mapped to the transmission antenna Tx1, the bits are mapped to the transmission antenna Tx2 exhibiting a lower transmission quality. Bits having a synthetic likelihood up to present of one are mapped to the transmission antenna Tx1 if the transmission antenna Tx1 is capable of being mapped, and the bits that cannot be mapped to the transmission antenna Tx1 are mapped to the transmission antenna Tx2. If the transmission antenna Tx1 is not capable of being mapped, bits having a synthetic likelihood of one are all mapped to the transmission antenna Tx2. Bits having a synthetic likelihood up to present of two are mapped to the transmission antenna Tx1 if the transmission antenna Tx1 is capable of being mapped, and the bits that cannot be mapped to the transmission antenna Tx1 are mapped to the transmission antenna Tx2.

(3) Upon the second retransmission, the per-bit likelihood control section 17c preferentially maps, in the transmission bit string, bits having the smallest synthetic likelihood up to present (two) to the transmission antenna Tx1 exhibiting a higher transmission quality. If there is any bits having the same synthetic likelihood (two) which cannot be mapped to the transmission antenna Tx1, the bits are mapped to the transmission antenna Tx2. Bits having a synthetic likelihood up to present of three are mapped to the transmission antenna Tx1 if the transmission antenna Tx1 is capable of being mapped, and the bits that cannot be mapped to the transmission antenna Tx1 are mapped to the transmission antenna Tx2. If the transmission antenna Tx1 is not capable of being mapped, bits having a synthetic likelihood of three are all mapped to the transmission antenna Tx2.

(4) Upon the third retransmission, the per-bit likelihood control section 17c preferentially maps, in the transmission bit string, bits having the smallest synthetic likelihood up to present (three) to the transmission antenna Tx1. If there is any bits having the same synthetic likelihood (three) which cannot be mapped to the transmission antenna Tx1, the bits are mapped to the transmission antenna Tx2. Bits having a synthetic likelihood up to present of four are mapped to the transmission antenna Tx1 if the transmission antenna Tx1 is capable of being mapped, and the bits that cannot be mapped to the transmission antenna Tx1 are mapped to the transmission antenna Tx2. If the transmission antenna Tx1 is not capable of being mapped, bits having a synthetic likelihood of four are all mapped to the transmission antenna Tx2.

Thereafter, the per-bit likelihood control section 17c preferentially maps bits having a smaller synthetic likelihood up to present to the transmission antenna Tx1 in the manner similar to those described above, which, in turn, results in facilitating mapping of bits having a greater synthetic likelihood to the transmission antenna Tx2. Note that bits having greater synthetic likelihoods may be preferentially mapped to the transmission antenna Tx2 exhibiting a lower transmission quality, as being opposite to the case of the example as set forth above.

As described above, when the MIMO transmitter 1 carries out retransmission processing in response to reception of a NACK from the MIMO receiver 2, it is possible to achieve an improvement in the communication capacity by mapping bits having a smaller synthetic likelihood up to present in a multi-level modulation signal to a transmission antenna 16 exhibiting a higher transmission quality since it is possible to make the per-bit signal quality (likelihood) after an HARQ synthesis to approach evenly.

Note that the transmission antenna control information generation section 19 is adapted to generate information (transmission antenna control information) indicative of which transmission antenna 16 has a higher transmission quality and thus a bit is mapped to by the per-bit likelihood control section 17c (mapping method), and send the information to the reception apparatus 2, similar to the third embodiment described above.

Thereby, advantageous effects similar to advantageous effects as set forth above with respect to the third embodiment can be obtained.

[6] Others

The symbol mapping control that has been described previously with respect to the first or second embodiment may be applied to the above-described third or fourth embodiments. That is, in addition to mapping control to the transmission antennas 16, symbol mapping control to a multi-level modulation signal (transmission symbol) may be carried out. This can provide a further effect in improving the communication capacity.

In addition, symbol mapping control to a multi-level modulation signal or mapping control to transmission antennas has been described as control on the per-bit transmission condition in the above-described examples, advantageous effects similar to those of each embodiment described above can be obtained by controlling on a per-bit transmission power.

That is, since the transmission quality of a signal is improved with an increase in the transmission power, it is possible to achieve an improvement in the communication capacity by controlling to reduce transmission power as the transmission count or synthetic likelihood of a bit is increased (controlling to increase the transmission power as the transmission count or synthetic likelihood of a bit is decreased), thereby making the per-bit transmission quality to approach evenly.

According to the technique as set forth above, it is possible to make the per-bit reception quality of a transmission bit string to approach evenly.

In addition, it is also possible to improve the wireless communication characteristic (for example, the communication capacity).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A transmission apparatus that transmits, to a reception apparatus, a transmission bit string, the transmission apparatus comprising:
    an obtainment unit that obtains, for each transmission to the reception apparatus, information on a per-bit transmission of the transmission bit string;
    a controller that controls a per-bit transmission condition for a current transmission bit string such that a per-bit transmission quality of the transmission bit string approaches evenly based on cumulative information on the transmissions up to a last transmission obtained by the obtainment unit; and
    a multi-level modulator that sends the current transmission bit string to the reception apparatus by mapping the current transmission bit string to a transmission symbol of multi-level modulation,
    wherein the obtainment unit comprises a per-bit transmission count counting section that counts a per-bit transmission count as the information on the per-bit transmission,
    wherein the controller comprises a symbol mapping controller that controls the multi-level modulator based on the per-bit transmission condition,
    wherein the multi-level modulator maps a first bit to a first bit position and a second bit to a second bit position,
    wherein a transmission count of the first bit, which counted up to the last transmission by the per-bit transmission count counting section, is higher than a transmission count of the second bit,
    wherein the first bit position has an error resilience which is lower than an error resilience of the second bit position, and
    wherein the first bit and the second bit are included in the current transmission bit string, and the first bit position and the second bit position are included in the transmission symbol of the multi-level modulation.

2. A transmission apparatus that transmits, to a reception apparatus, a transmission bit string, the transmission apparatus comprising:
    an obtainment unit that obtains, for each transmission to the reception apparatus, information on a per-bit transmission of the transmission bit string;
    a controller that controls a per-bit transmission condition for a current transmission bit string such that a per-bit transmission quality of the transmission bit string approaches evenly based on cumulative information on the transmissions up to a last transmission obtained by the obtainment unit; and
    a multi-level modulator that sends the current transmission bit string to the reception apparatus by mapping the current transmission bit string to a transmission symbol of multi-level modulation,
    wherein the obtainment unit comprises a per-bit likelihood obtaining section that determines per-bit likelihood as the information on the per-bit transmission,
    wherein the controller comprises a symbol mapping controller that controls the multi-level modulator based on the per-bit transmission condition,
    wherein the multi-level modulator maps a first bit to a first bit position and a second bit to a second bit position,
    wherein a synthetic likelihood of the first bit, which is synthesized based on the likelihood determined up to the last transmission by the per-bit likelihood obtaining section, is higher than a synthetic likelihood of the second bit,
    wherein the first bit position has an error resilience of which is lower than an error resilience of the second bit position, and
    wherein the first bit and the second bit are included in the current transmission bit string, and the first bit position and the second bit position are included in the transmission symbol of the multi-level modulation.

3. A transmission apparatus that transmits, to a reception apparatus, a transmission bit string, the transmission apparatus comprising:
    an obtainment unit that obtains, for each transmission to the reception apparatus, information on a per-bit transmission of the transmission bit string;
    a controller that controls a per-bit transmission condition for a current transmission bit string such that a per-bit transmission quality of the transmission bit string approaches evenly based on cumulative information on the transmissions up to a last transmission obtained by the obtainment unit; and
    a mapping unit that maps bits included in the current transmission bit string to a plurality of transmission antennas and sends the current transmission bit string to the reception apparatus,
    wherein the controller comprises a per-bit likelihood obtaining section that determines a per-bit likelihood as the information on the per-bit transmission and an antenna mapping controller that controls the mapping unit based on the per-bit transmission condition,
    wherein the mapping unit maps a first bit to a first antenna and a second bit to a second antenna,
    wherein a synthetic likelihood of the first bit, which is synthesized based on the likelihood determined up to the last transmission by the per-bit likelihood obtaining section, is higher than a synthetic likelihood of the second bit,
    wherein the first antenna has a transmission quality which is lower than a transmission quality of the second antenna, and
    wherein the first bit and the second bit are included in the current transmission bit string, and the first antenna and second antenna are included in a plurality of transmission antennas.

4. The transmission apparatus according to claim 3, wherein the antenna mapping controller identifies the transmission antenna that has a lower transmission quality based on quality information on each of the transmission antennas that is measured at the reception apparatus and notified from the reception apparatus, and controls the mapping based on the identified information.

5. The transmission apparatus according to claim 3, further comprising a transmission antenna information transmitter that notify the reception apparatus of information on a transmission antenna that is mapped.

* * * * *